Oct. 13, 1936.  A. D. CAPEHART  2,057,607

AUXILIARY WHEEL

Filed Feb. 4, 1935  2 Sheets-Sheet 1

Ashbourne D. Capehart,
INVENTOR

BY Victor J. Evans & Co.
ATTORNEY

P. J. Hickey
WITNESS

Oct. 13, 1936.                A. D. CAPEHART                2,057,607
                               AUXILIARY WHEEL
                            Filed Feb. 4, 1935            2 Sheets-Sheet 2
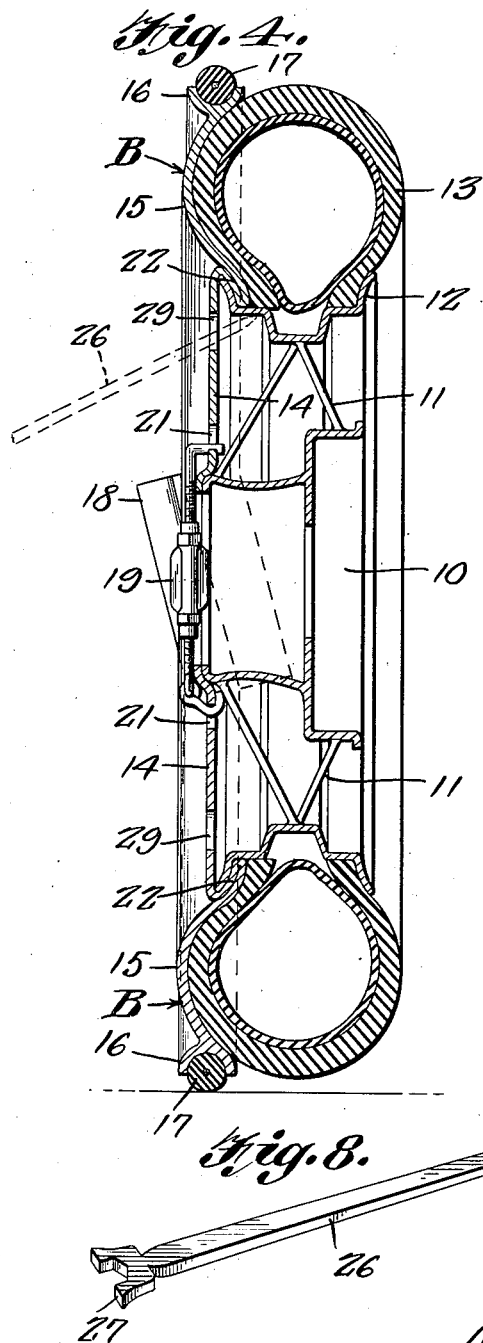
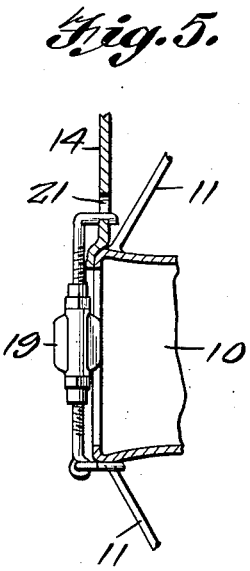
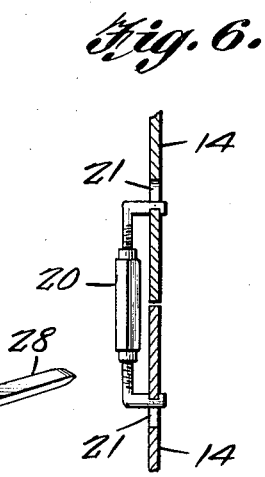
Ashbourne D. Capehart,
INVENTOR
BY Victor J. Evans & Co.
ATTORNEY
WITNESS Patented Oct. 13, 1936

2,057,607

UNITED STATES PATENT OFFICE 2,057,607

AUXILIARY WHEEL

Ashbourne D. Capehart, Oxford, N. C.

Application February 4, 1935, Serial No. 4,974

1 Claim. (Cl. 301—38)

The invention relates to an auxiliary wheel and of a kind for attachment to a vehicle wheel of the pneumatically tired type.

The primary object of the invention is the provision of a wheel of this character, wherein the same can be conveniently and easily attached to a vehicle wheel carrying a pneumatic tire so that when the said tire becomes deflated by puncture, blowout or otherwise the auxiliary wheel will support the vehicle for the continued travel thereof without damage to the deflated tire and thus enabling the vehicle to reach a service station for the repair of the tire without running upon the said deflated tire.

Another object of the invention is the provision of a wheel of this character, wherein the same includes complemental halves: Thus one half may be applied to a vehicle wheel at the upper half of the wheel, when the tire of the wheel is deflated, so that when the wheel is turned it will be lifted off of the deflated tire and the other half applied in proper position so that the auxiliary wheel will afford traction in the servicing of the wheel until the damaged or deflated tire has been conditioned for service.

A further object of the invention is the provision of an auxiliary wheel of this character, which is simple in its construction, thoroughly reliable and efficient in its operation, readily and easily applied to and removed from a vehicle wheel having a pneumatic tire, and is strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 4 is an enlarged vertical transverse sectional view through the vehicle wheel and the auxiliary wheel.

Figure 5 is a sectional view on the line 5—5 of Figure 1.

Figure 6 is a fragmentary sectional view on the line 6—6 of Figure 3.

Figure 8 is a perspective view of the tool or implement used with the auxiliary wheel for the application and removal of the same from a vehicle wheel.

Similar reference characters indicate corresponding parts throughout the several views in the drawings.

Figure 1:
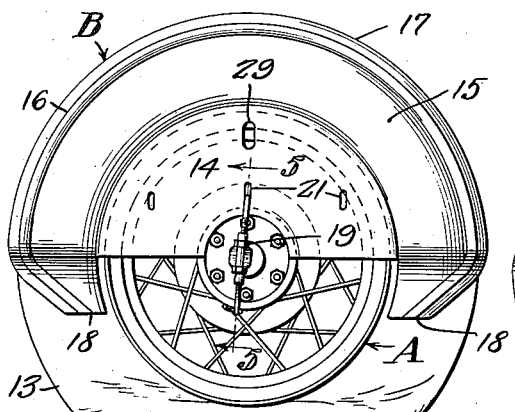
Figure 1 is a side elevation of a vehicle wheel showing the pneumatic tire deflated and one half of the auxiliary wheel attached to the vehicle wheel.

Referring to the drawings, particularly Figures 1 to 6, inclusive, A designates generally a vehicle wheel, in this instance of the wire spoke type having the hub 10, spokes 11 and felly 12, the spokes 11 being integrally joined with the hub and felly. The felly 12 is of the hollow or channeled construction for the demountable mounting of the pneumatic tire 13 thereon, the latter being conventional in its make-up.

The auxiliary wheel for use with the vehicle wheel A comprises complemental halves B—B each being made from sheet metal and of half disk form having a flat center portion 14 with a bulged outer portion 15 concentric thereto with a peripheral channeled felly 16 for the seating therein of a resilient tread 17. These halves B—B mate each other and when mated the perimeter of the same is of a diameter substantially equal to the diameter of the tire 13 at the tread thereof under normal inflation.

The ends of the felly portions 16 of the respective halves B—B are bent laterally in the same direction as at 18. The bent ends 18 on one of the sections are extended inwardly with respect to the wheel, while the bent ends 18 on the second or co-operating section are extended laterally away from said wheel so that the two ends of one of the sections can overlap the two ends of the other section, when the sections are associated.

For the fastening of the halves B—B of the auxilary wheel in mated relation and upon the vehicle wheel, A there are provided the turn buckle clamps 19 and 20, respectively, the halves being formed with elongated slots 21 for the securing of the clamps in place to fasten the halves B together and to the vehicle wheel. The halves B have bent or struck therefrom clencher flanges 22 for engaging with the side of the felly 12 of the vehicle wheel A in the fastening of the halves to the latter.

Figure 7:
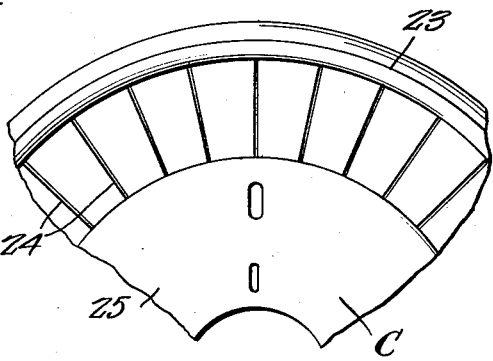
Figure 7 is a fragmentary elevation of a modified form of auxiliary wheel.

In Figure 7 of the drawings there is shown a slight modification wherein each half C of the auxiliary wheel has next to the felly portion 23 thereof spaced radially disposed slits 24 which provide resiliency in the said half C concentrically with relation to the center portion 25.

In Figure 8 of the drawings there is shown an implement 26 employed for the mounting and demounting of the auxiliary wheel and this implement affords a wrench 27 at one end so that the turn buckles of the clamps 19 and 20 can be operated thereby while the other end 28 of the implement or tool is serviceable for prying purposes. In the application of the halves to the vehicle wheel A this end 28 of the implement or tool is insertable through a hole 29 provided in each half B or C for the purpose of fulcruming the tool on the vehicle wheel felly or rim 12 and forcing the flange 22 between the tire 13 and a rim flange as shown in Figure 4.

Figure 2:
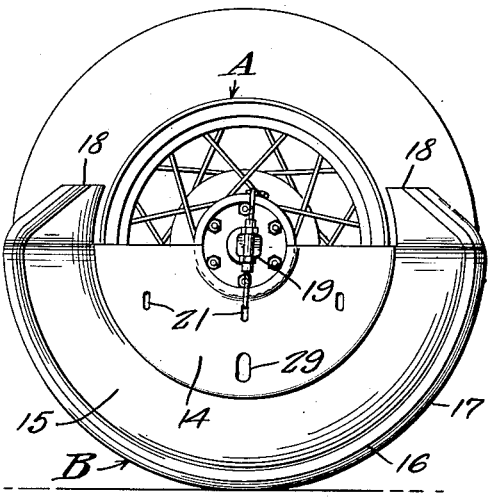
Figure 2 is a view similar to Figure 1 showing the vehicle wheel shifted with the half of the auxiliary wheel sustaining said vehicle wheel elevated for the application of the other half of the auxiliary wheel thereto.
Figure 3:
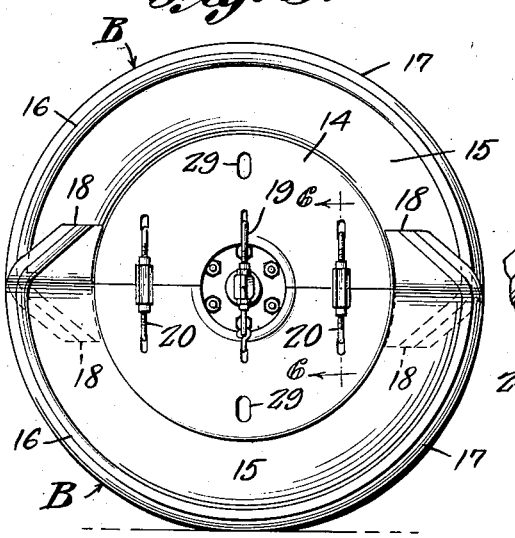
Figure 3 is a view similar to Figure 2 showing the complemental halves of the auxiliary wheel attached to the vehicle wheel.

In the application of the auxiliary wheel after the tire 13 becomes deflated, it is necessary to put one half B in place upon the wheel A and this is done by locating such half at the uppermost portion of the wheel, using the clamp 19 for the holding of such half in place until the wheel A has been turned a full half revolution whereupon the applied half B elevates the wheel from the position shown in Figure 1 to that shown in Figure 2 of the drawings. The clamp 19 thus applied is temporarily removed and thereafter the other half B or C of the auxiliary wheel is brought into position and clenched on the felly of said wheel by the use of the implement or tool 26 and finally the clamps 19 and 20 secure these halves B or C in their mated or matched relation together and upon the vehicle wheel so that the auxiliary wheel will support the load and afford traction, relieving the deflated tire 13 therefrom. The reversely angled ends of the sections B, it should be stated, provide one of the most important features of the invention. One of the halves or sections B may be arranged on the wheel with comparative ease, but when the wheel is turned to the positions shown by Figures 2 and 3 of the drawings, the application of the second section B, by a single operator, would be a matter of difficulty were the meeting edges of the sections straight throughout. The operator would be forced to hold this section with one hand and grope with his other hand to obtain the necessary tools and fastening means for securing the sections together and perhaps exert force upon the periphery of the unattached section, which might inflict injury thereto and which would also add to the labor of the operator. By employing the wings or reversely angled ends on the sections of my improvement, one of the sections B is attached to the wheel by the central clamp 19 and the wheel is turned (by the engine of the machine) to the position shown by Figure 3. The second or detached section B is lifted by the operator and arranged to have its angle ends contact with and glide over the angle ends of the attached section B. The unattached section will slide to proper position without further handling of the operator and it is then merely necessary to apply the fastening means to the mating sections B.

What is claimed is:

An auxiliary wheel of the kind described, comprising complemental substantially half circular sections, each having a felly at its outer periphery, tread pieces fitting said fellies, means clamping the sections in operative position upon a pneumatically tired vehicle wheel, and inwardly directed and angularly disposed felly extensions on said sections for overlapping each other when the sections are upon the vehicle wheel.

ASHBOURNE D. CAPEHART.